Nov. 18, 1969     R. O. BUELL     3,479,007
NON-LUBRICATED INJECTION VALVE ASSEMBLY
Filed Aug. 18, 1966
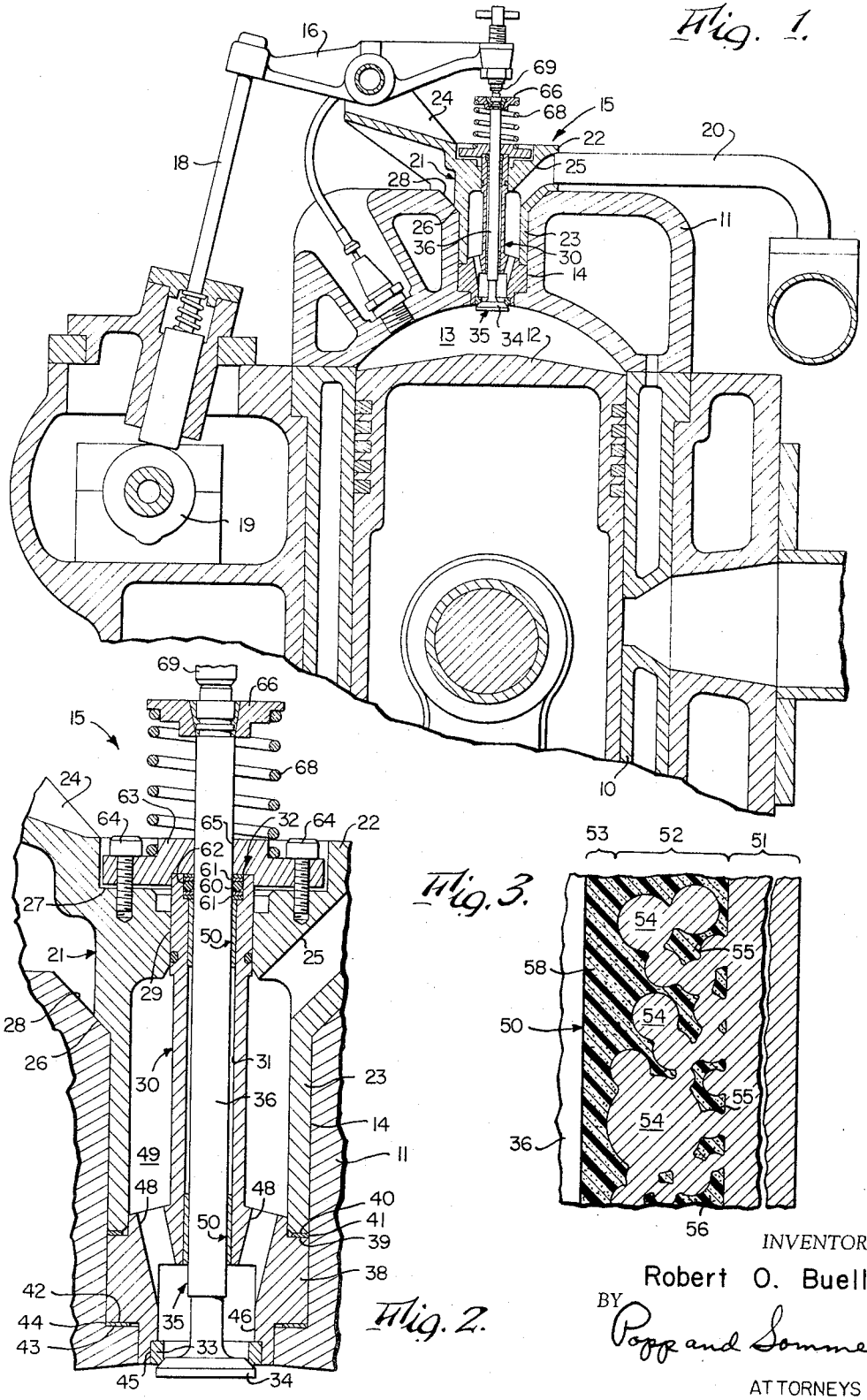
INVENTOR.
Robert O. Buell
BY Popp and Sommer
ATTORNEYS United States Patent Office 3,479,007
Patented Nov. 18, 1969

3,479,007
NON-LUBRICATED INJECTION VALVE ASSEMBLY
Robert O. Buell, Bolivar, N.Y., assignor to Dresser Industries, Inc., Dallas, Tex., a corporation of Delaware
Filed Aug. 18, 1966, Ser. No. 573,372
Int. Cl. F16k 1/04, 25/00
U.S. Cl. 251—214                                    7 Claims

ABSTRACT OF THE DISCLOSURE

A valve assembly, adapted for non-lubricated operation of an engine valve having a head and an elongated stem, includes an elongated valve guide body having axially spaced bushings for guiding the valve stem. The valve guide body supports valve seat means at one end and annular seal means for the stem at the other end so that the valve member is entirely supported only by the single valve guide body. The bushings include a stem engaging layer composed of a mixture of tetrafluoroethylene and lead powder, an intermediate layer of porous bronze impregnated with that mixture, and an outer reinforcing band layer.

This invention relates to a valve assembly and more particularly to a valve assembly used for the injection of gaseous fuel into the power cylinder of an internal combustion engine.

Heretofore gas engine injection valve assemblies have been subject to malfunction due to the elevated temperature environment in which they operated which produced undesired relative dimensional changes in different parts of such an assembly, and further because of the fact that they were required to be lubricated which led ofttimes to sticking valves due to gumming up when over lubricated and due to friction when insufficiently lubricated.

The primary object of the present invention is to provide an improved gas engine injection valve assembly which does not possess the above-noted disadvantages of prior art valve assemblies.

A specific object is to provide such a non-sticking valve assembly which operates satisfactorily in the high temperature environment encountered without resulting warpage of the valve stem due to undesired dimensional changes resulting from temperature gradients in the various parts of the assembly.

An equally important specific object is to provide such a non-sticking valve assembly which does not require lubrication.

Other objects are to provide such a valve assembly which is relatively simple in construction, relatively inexpensive, of long life, and not likely to get out of order so as to require repair.

Still other objects and advantages of the present invention will be apparent from the following detailed description of a preferred embodiment thereof taken in conjunction with the accompanying drawing wherein:

FIG. 1 is a fragmentary vertical sectional view through the upper end of the power cylinder of a typical gas engine on which the injection valve assembly of the present invention is shown mounted.

FIG. 2 is a fragmentary enlarged similar sectional view thereof and illustrating the construction of the valve assembly in more detail.

FIG. 3 is a fragmentary greatly enlarged sectional view of the wall of one of the bushings forming an element of the valve assembly and depicting the physical structure of the bushing wall.

Referring to FIG. 1, the numeral 10 represents a power cylinder of a conventional two-cycle gas engine which is closed at its upper end by a cylinder head 11. A piston 12 is shown as being reciprocably arranged in cylinder 10 so as to provide, jointly with the cylinder end head, a chamber 13. Shown arranged in a counterbored hole 14 provided vertically and centrally in cylinder head 11 is a valve assembly embodying the present invention and represented generally by the numeral 15. Shown associated with valve assembly 15 is a rocker arm 16 actuated through a push rod 18 by a cam 19 on a camshaft.

The purpose of valve assembly 15 is to control the injection of gaseous fuel into chamber 13, such fuel being supplied through a conduit 20. The present invention is concerned only with the construction of valve assembly 15 which will now be described.

Valve assembly 15 is shown as including a main body 21 having a head portion 22 from which a tubular cylindrical portion 23 depends, and a pair of upwardly and outwardly extending support arms 24 between which rocker arm 16 is suitably mounted for pivotal movement. Head portion 22 is also shown as provided with a passage 25 which establishes communication between the interior of tubular portion 23 and fuel supply conduit 20. A downwardly facing tapered annular shoulder 26 on the exterior of body head portion 22 is shown as seated on a countersunk outer end portion 28 of hole 14 in cylinder head 11. Valve body 21 is secured to the cylinder head in any suitable manner as by holddown screws (not shown) which screw into the cylinder head and clamp shoulder 26 against seat 28.

The head portion 22 of valve body 21 is shown as provided with a central vertical bore 29 enlarged adjacent its upper end to provide an upwardly facing annular shoulder 27. Arranged in bore 29 and extending below the lower end of tubular portion 23 of valve body 21, is a valve stem guide body represented generally by the numeral 30. This guide body 30 is a single member having a vertically extending through bore 31 enlarged at its upper end to accommodate an annular seal assembly indicated generally at 32, and also enlarged at its lower end to accommodate an annular valve seat 33. This seat 33 is adapted to be engaged by the head 34 of a valve indicated generally at 35 and also having a valve stem 36 which extends upwardly completely through bore 31.

Valve guide body 30 is shown as having an enlarged annular portion 38 adjacent its lower end to provide an upwardly facing annular shoulder 39 which opposes downwardly facing annular end face 40 of the tubular portion 23 of main valve body 21. An annular gasket 41 is shown as interposed between faces 39 and 40. Lower head portion 38 also has a downwardly facing annular shoulder 42 which opposes an upwardly facing annular shoulder 43 provided on cylinder head 11, an annular gasket 44 being shown interposed between surfaces 42 and 43.

Valve seat 33 is an annular member press-fitted into an outer counterbore 45 provided in the lower end of guide body 30. Immediately above counterbore 45 is another counterbore 46. A series of upwardly and slightly outwardly inclining, circumferentially spaced passages 48 extend through the head portion 38 of guide body 30 to establish communication between counterbore 46 at their lower end and a chamber 49 at their upper end defined by the radially spaced annular walls of guide member 30 and tubular portion 23. Gas supply passage 25 communicates with this chamber 49.

An important feature of the present invention is the provision of axially spaced bushings 50, one arranged adjacent the upper end and the other arranged adjacent the lower end of this bore. Upper bushing 50 is immediately adjacent and arranged below annular seal assembly 32 and lower bushing 50 is arranged adjacent passages 48. These bushings 50 slidably support for reciprocation valve stem 36 which has a cylindrical periphery.

The composition of each of bushings 50 is important in order to provide a non-lubricated valve assembly. As shown in FIG. 3 which is representative of end bushing 50, the same includes an outer layer 51, an intermediate layer 52 and an inner layer 53. Outer layer 51 is preferably a steel reinforcing band which supports and surrounds middle layer 52. This middle layer 52 is constituted by a series of generally spherical bronze bodies 54 which are various sizes and some of which attach themselves to others and some attach themselves to outer layer 51, the spaces between these bodies 54 providing a series of intercommunicating voids 55. This structure is produced by sintering spherical bronze powder onto a steel backing, for example. Voids 55 are filled or impregnated with a mixture of tetrafluoroethylene and lead powder. The filling of the voids 55 with this mixture is represented by the numeral 56 in FIG. 3. This middle layer 52 is provided with an overlay of this same tetrafluoroethylene and lead powder mixture and is represented in FIG. 3 by the numeral 58.

Thus the inner surface of each bushing 50 which engages valve stem 36 is composed of a mixture of the above described composition to constitute an inner layer, backed up by a thin porous bronze middle layer impregnated with a mixture of the same composition, and still further outwardly backed up by the steel backing 51.

This steel backing 51 provides structural strength to permit high loads and a lasting, tight interference fit between the bushing and the bore wall of guide member 30. The impregnated bronze layer conducts heat away from the rubbing surface and acts as a reservoir for the tetrafluoroethylene-lead mixture, to assure a constant supply at the rubbing surface. The overlay 53 applies a thin coating of the mixture to the mating surface of valve stem 36 to smooth over any irregularity therein and make a low friction surface of it.

Annular seal assembly 32 comprises an elastomeric O-ring 60 backed up on opposite axial sides by a pair of flat backup rings composed of tetrafluoroethylene and individually represented by the numeral 61. Seal assembly 32 is arranged in a counterbore 62 provided in the upper end of guide member 30 and is shown closed by a cover 63 which bears against the upper end facing of this guide member and is secured by a series of hold-down screws 64 secured to the head portion of main valve body 21.

The upper end portion of valve stem 36 extends through a central hole 65 provided in cover 63 and carries at its upper extremity an annular spring retainer 66. Between retainer 66 and cover 63 is a valve closing spring 68. An adjustable pin 69 is shown as carried by one end of rocker arm 16 and this pin is adapted to engage abuttingly the upper end of valve stem 36.

It will be seen that as cam 19 is rotated, rocker arm 16 is caused to oscillate whereby downward movement of pin 69 opens injection valve 35 to allow gas to flow from conduit 20 through connected passages 25, 49, 48 and 46 into cylinder chamber 13, the valve being closed by the upward force exerted by spring 68.

It will be appreciated that by reason of the mounting of valve assembly 15 on cylinder head 11, with combustion of air and fuel mixtures in cylinder chamber 13 and the attendant high temperature and pressure produced thereby, this valve assembly is located in a high temperature and pressure environment. By guiding valve stem 36 adjacent each end rather than along its full length, the possibility of this valve stem sticking due to being warped which could produce binding if a long continuous close fitting hole were provided, is eliminated. The bushings 50, relatively short individually and axially spaced from each other, present as little friction surface as possible and yet, by being provided in one common bore, insure positive alinement at all times. Also the seat 33 is fixed to the same member, namely guide member 30, which supports the valve stem so that constant alinement of all parts is insured, friction is reduced to a minimum and the area where binding of the valve stem could occur due to stem warpage has been relieved, and lubrication has been eliminated.

The O-ring seal assembly 32 functions to seal any gas leakage past the two bushings 50 until the parts are up to operating temperature and some of the bushing material has been transferred to the stem coating its surface. There is very little leakage even before this breaking-in period. The backup rings 61 have for their purpose to prevent the O-ring 60 from following the reciprocating motion of valve stem 36 into the space between the stem and the end of bore 31 or the end of hole 65. These backup rings 61 fit the stem closely but do not damage it, whereas holes 31 and 65 in the adjacent metal parts must be larger so that there is no metal-to-metal contact with the valve stem.

From the foregoing, it will be seen that the embodiment shown and described provides a perfectly alined, free-running, nonscoring, leak-proof valve assembly to operate continuously at high temperature and under pressure and requiring no lubrication whatever and minimum attention. This valve assembly construction prevents galling, gumming and sticking due to improper or over lubrication or misalinement, and prevents scoring from lack of lubrication. The invention is intended to be limited only by the scope of the appended claims.

What is claimed is:

1. A non-lubricated injection valve assembly, comprising a single valve guide body adapted to be mounted in a cylinder head, said body having a bore extending therethrough, axially spaced bushings arranged in said bore, valve seat means supported on said body adjacent one end of said bore, a valve closure member having a head and stem, said stem being reciprocably arranged in said bushings, and annular seal means supported on said body at the other end of said bore and sealingly surrounding said stem.

2. A valve assembly according to claim 1 wherein each of said bushings includes a stem engaging layer composed of a mixture of tetrafluoroethylene and lead powder.

3. A valve assembly according to claim 2 wherein said layer is surrounded by a porous bronze layer impregnated with said mixture.

4. A valve assembly according to claim 3 wherein said porous layer is surrounded by a reinforcing band.

5. A valve assembly according to claim 1 wherein said seal means includes an elastomeric O-ring and backup rings on axially opposite sides of said O-ring.

6. A valve assembly according to claim 5 wherein said backup rings are composed of tetrafluoroethylene.

7. A valve assembly according to claim 1 wherein each of said bushings includes an outer reinforcing band, an intermediate porous bronze layer impregnated with a mixture of tetrafluoroethylene and lead powder and a stem engaging inner layer composed of said mixture, and seal means includes an elastomeric O-ring and tetrafluoroethylene backup rings on axially opposite sides of said O-ring.

References Cited

UNITED STATES PATENTS

| 2,691,814 | 10/1954 | Tait | 29—182.5 |
| 2,807,253 | 9/1957 | Etchells | 123—188 |
| 3,056,709 | 10/1962 | Rising et al. | |

FOREIGN PATENTS

| 667,091 | 7/1963 | Canada. |

WILLIAM F. O'DEA, Primary Examiner

DAVID R. MATTHEWS, Assistant Examiner

U.S. Cl. X.R.

123—90, 188, 193; 308—4, 238